United States Patent [19]
Kmetyko

[11] Patent Number: 6,131,839
[45] Date of Patent: Oct. 17, 2000

[54] FISHING REEL AND BASE SUPPORT THEREFOR

[76] Inventor: Sandor Kmetyko, 42831 Old Orchard Road, Chilliwack, British Columbia, Canada, V2R 2H6

[21] Appl. No.: 09/081,612

[22] Filed: May 20, 1998

[51] Int. Cl.[7] .................................................. A01K 89/00
[52] U.S. Cl. .......................................... 242/317; 242/257
[58] Field of Search .................................... 242/249, 257, 242/258, 263, 295, 299, 316, 317, 321

[56] References Cited

U.S. PATENT DOCUMENTS

| | | | |
|---|---|---|---|
| 554,011 | 2/1896 | Sutton | 242/263 |
| 638,194 | 11/1899 | Arnold | 242/263 X |
| 2,006,481 | 7/1935 | Russell | 242/263 |
| 2,132,430 | 10/1938 | Norton | 242/263 |
| 5,161,750 | 11/1992 | Hitomi | 242/295 |
| 5,393,006 | 2/1995 | Miyazaki et al. | 242/263 X |
| 5,503,346 | 4/1996 | Miyazaki et al. | 242/263 X |
| 5,752,667 | 5/1998 | Merrill et al. | 242/317 X |

*Primary Examiner*—Donald P. Walsh
*Assistant Examiner*—Emmanuel M. Marcelo
*Attorney, Agent, or Firm*—Siemens Patent Services

[57] ABSTRACT

A fishing reel includes a frame, a base for securing the frame to a fishing rod, a fishing line spool rotationally mounted to the frame for rotation about a spool axis, a main drive gear mounted within the frame for rotation about a drive gear axis, a crank for rotating the drive gear about the drive gear axis, and a transmission for releasably engaging the drive gear with the spool. The transmission includes a spool gear fixedly mounted to the spool and an intermediate gear moveable between a first position engaging the drive gear in gear transmission engagement with the spool gear and a second position where such engagement is released. If desired, the reel may include a drag mechanism releasably engageable with the spool gear for imposing a drag upon rotation of said spool.

15 Claims, 6 Drawing Sheets

FISHING REEL AND BASE SUPPORT THEREFOR

FIELD OF THE INVENTION

The present invention relates to fishing reels, and in particular to fishing reels of the type having a flat reel construction.

BACKGROUND TO THE INVENTION

The prior art is replete with fishing reels of varying complexity in design. These range from relatively basic direct drive (viz. gearless) structures as disclosed, for example, in U.S. Pat. No. 2,749,057 granted to Jenkins et al. on Jun. 5, 1956, and U.S. Pat. No. 3,039,716 granted to Visockis on Jun. 19, 1962, to multiple geared drive structures as disclosed, for example, in U.S. Pat. No. 2,602,602 granted to Vijande on Jul. 8, 1952. U.S. Pat. No. 3,004,731 granted to Mauborgne on Oct. 17, 1961, and U.S. Pat. No. 3,033,485 granted to Sherer on May 8, 1962.

A primary limitation of direct drive structures is speed. The rate at which a fishing reel spool turns when taking up fishing line has a 1:1 relationship with the rate at which the user can move the reel crank through 360° of rotation. An advantage, however, is that direct drive structures are typically able to freewheel with minimal resistance during casting or other times such as float fishing or bottom bouncing when it may be desired to allow line to play out with minimal resistance. Further, they have a compact flat reel construction.

In contrast, the speed of multiple geared drive structures is typically enhanced. With an appropriate selection of gears and gear drive ratios, a reel spool can be made to travel at an angular speed significantly greater than the angular speed of the crank. However, such structures are typically unable to freewheel or are relatively complex in design and construction.

A primary object of the present invention is to provide a new and improved fishing reel that is not only able to freewheel but also has enhanced speed characteristics.

A further object of the present invention is to achieve such characteristics in a flat reel structure that is relatively simple in design and construction.

Yet another object of the present invention is to provide an improved mechanism that permits the reel to be preferentially rotated relative to the fishing rod on which the reel is mounted from a reeling position to a casting position and vice-versa.

SUMMARY OF THE INVENTION

In a broad aspect of the present invention, there is provided a fishing reel comprising a frame, a base for securing the frame to a fishing rod, a fishing line spool rotationally mounted to the frame for rotation about a spool axis, a main drive gear mounted within the frame for rotation about a drive gear axis, a crank for rotating the drive gear about the drive gear axis, and a transmission for releasably engaging the drive gear with the spool. The transmission includes a spool gear fixedly mounted to the spool and an intermediate gear moveable between a first position engaging the drive gear in gear transmission engagement with the spool gear and a second position where such engagement is released. If desired, the reel may include drag means releasably engageable with the spool gear for imposing a drag upon rotation of said spool.

In one embodiment, the intermediate gear is mounted to a free end of a pivot arm within the frame. An opposed end of the pivot arm is pivotally mounted to the frame. A spring biases the pivot arm to a first position where the intermediate gear is held in gear transmission engagement between the drive gear and the spool gear, and a means is provided for pivoting and holding the pivot arm against such bias to a second position where the gear engagement is released. Such means may comprise a lever arm pivotally mounted within the frame, the lever arm extending from an inside end leverable against the pivot arm to a free end outside said frame. The lever arm is moveable between a release position that permits the spring to bias the pivot arm to the first pivot arm position and a latch position that holds the pivot arm in the second pivot arm position against the bias of the spring. In the release position, the spool may demonstrate enhanced speed characteristics. In the latch position, it is able to freewheel.

In a preferred embodiment, the base of the reel comprises a footing that is fittable to the rod and a stem fixedly connected at one end to the footing and rotatably supported at an opposed end by a bracket connected to said frame. The stem is rotatable in the support bracket between a first angle of rotation where the spool axis extends substantially at right angles to the longitudinal axis of the rod and a second angle of rotation where the spool axis extends substantially parallel to the longitudinal axis of said rod. Preferably, a means is provided for releasably latching the stem at a desired angle of rotation in the bracket.

The foregoing and other features of the invention will now be described in more detail with reference to the drawings.

DETAILED DESCRIPTION OF PREFERRED EMBODIMENTS

The fishing reel shown in the figures has an overall flat reel construction including a reeling side generally designated 10 and a spooling side generally designated 80.

Figure 5:
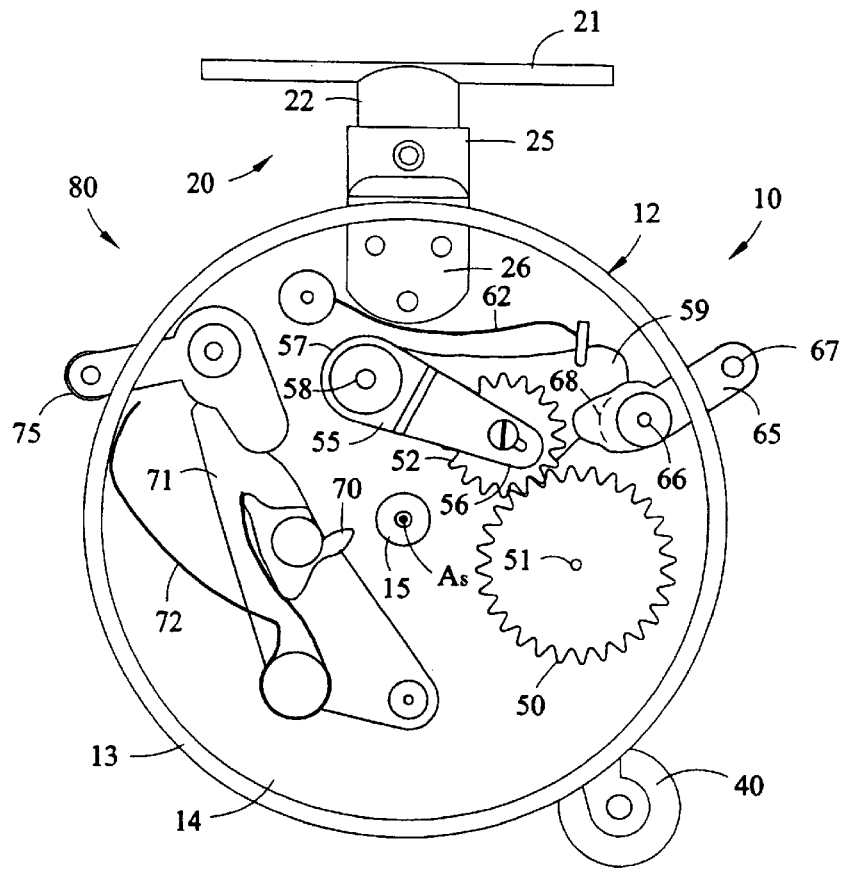
FIG. 5 is an elevation view of the inside of the reeling side of the reel shown in FIG. 1, as seen when the spooling side of the reel is removed.
Figure 7:
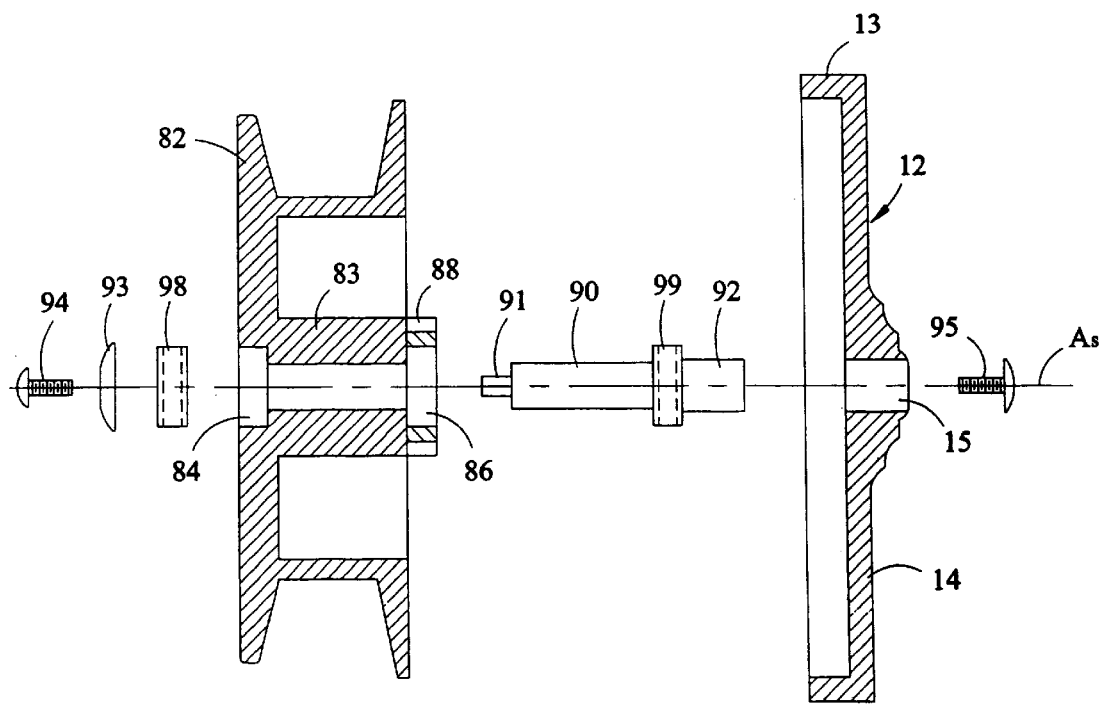
FIG. 7 is a partially sectioned exploded view showing the assembly of the spool and frame parts of the reel shown in FIG. 1.

Reeling side 10 includes a main body or frame generally designated 12 formed by a cylindrical outer wall 13 and a disc shaped side wall 14, a base generally designated 20 for securing frame 12 to a fishing rod (not shown), and a rotatable crank 40 for operating the reel. As best seen in FIGS. 5 and 7, frame 12 is completely open on the side opposite to side wall 14.

Figure 6:
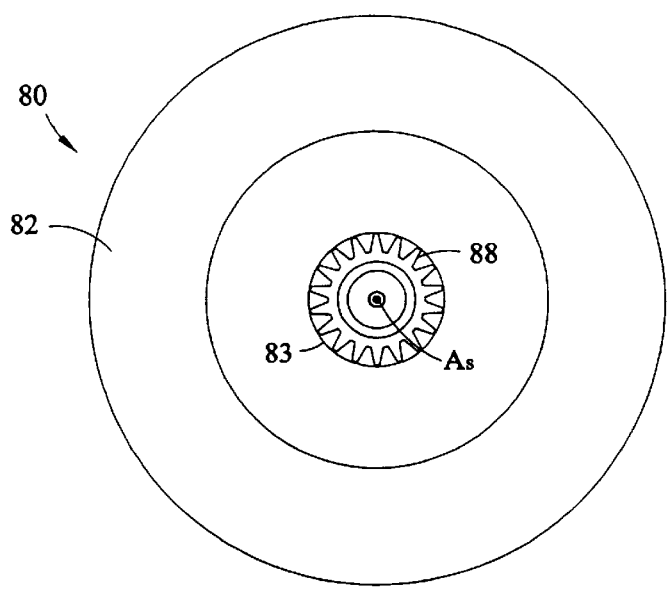
FIG. 6 is an elevation view of the inside of the spooling side of the reel shown in FIG. 1, as seen when the reeling side of the reel is removed.

Referring to FIGS. 6 and 7, spooling side 80 includes a fishing line spool 82 10 rotationally mounted to frame 12 for rotation relative to the frame about spool axis $A_s$. A spool gear 88 is fixedly mounted on hub 83 of spool 82, the axis of gear 88 being axially aligned with axis $A_s$. In more detail, and as shown in FIG. 7, spool 82 is supported by bearings 98, 99 carried on shaft 90. Bearing 98 is fitted within socket 84 of spool 82 where it is secured by cap 93 and bolt 94, the latter of which threads into end 91 of shaft 90. Similarly, as shaft 90 is inserted into hub 83, bearing 99 fits within socket 86 defined by the inner perimeter of gear 88 and the inner end of hub 83. End 92 of shaft 90 slidingly fits into central opening 15 in frame 12. Frame 12 and the shaft are secured together by bolt 95 which threads into end 92.

Base 20 includes a conventional footing 21 which enables the reel to be fitted and secured to a reel support (not shown) of a fishing rod in a conventional manner. Footing 21 is fixedly connected at one end of cylindrical stem 22, the lower end of which stem is rotatably mounted in a bracket 25. Bracket 25 includes a flange 26 which, as best seen in FIG. 5, is fixedly secured to wall 14 within frame 12.

Figure 1:
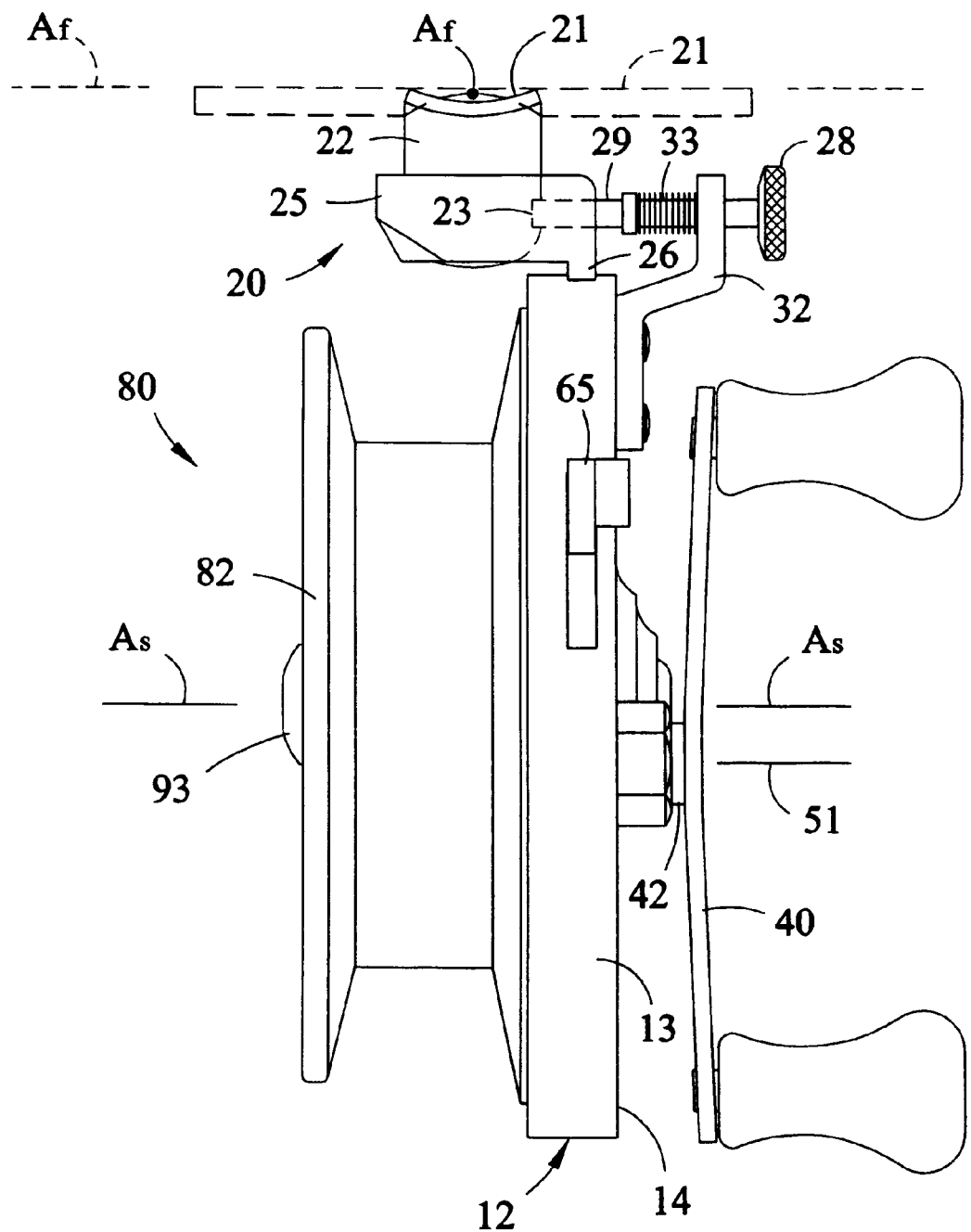
FIG. 1 is an outside end view of a fishing reel in accordance with the present invention.
Figure 2:
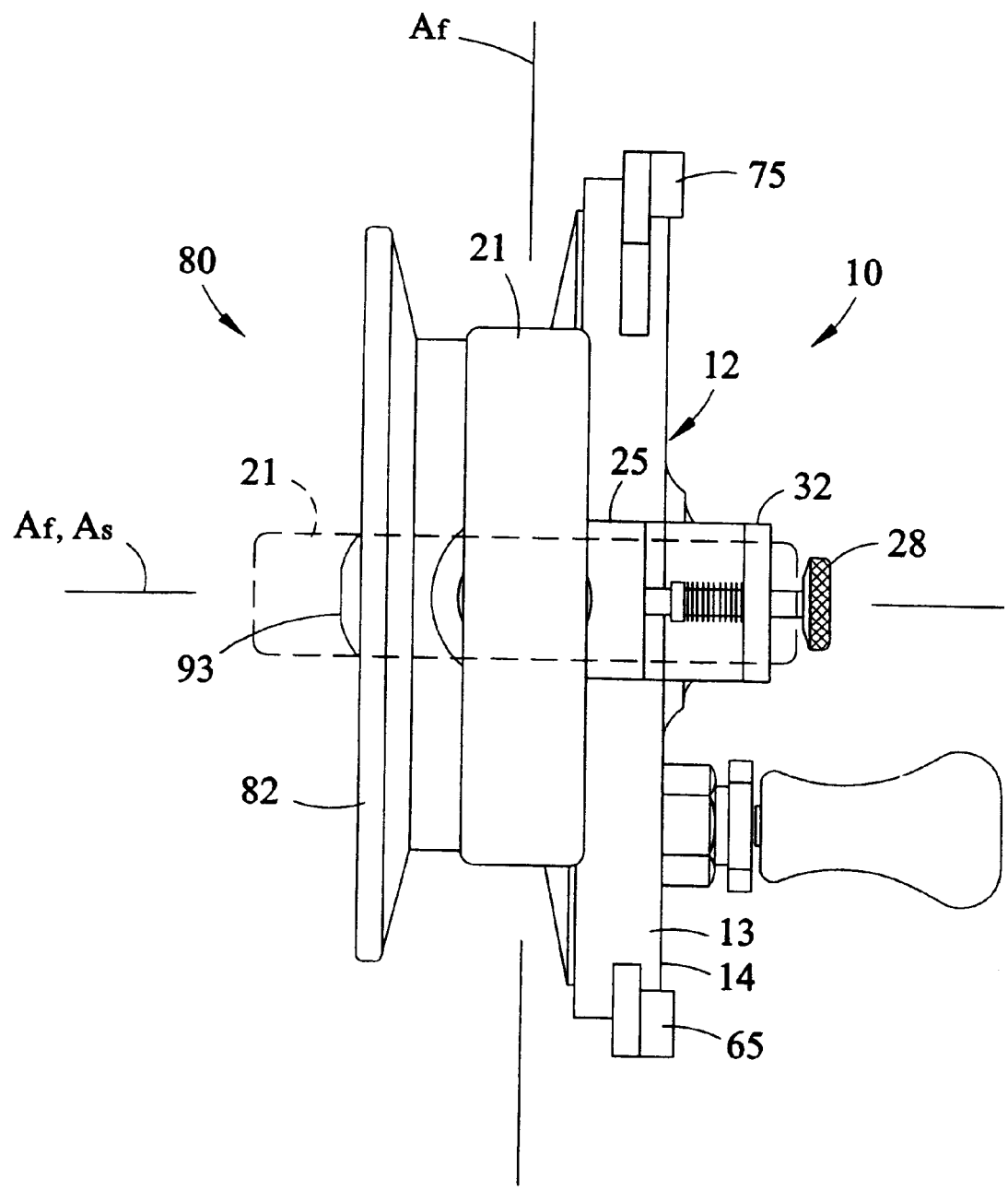
FIG. 2 is an outside top view of the reel shown in FIG. 1.
Figure 3:
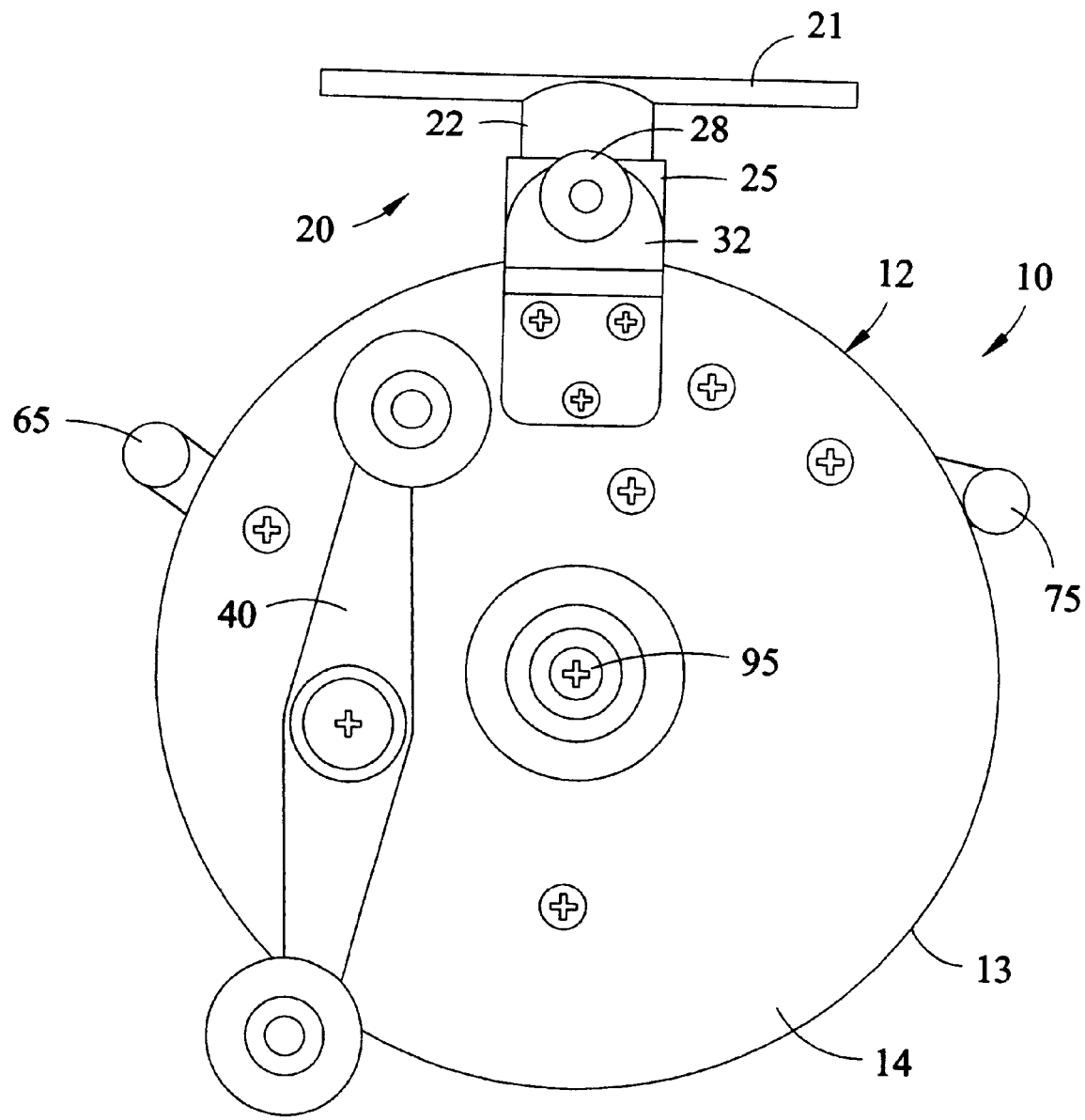
FIG. 3 is an elevation view of the outside of the reeling side of the reel shown in FIG. 1.
Figure 4:
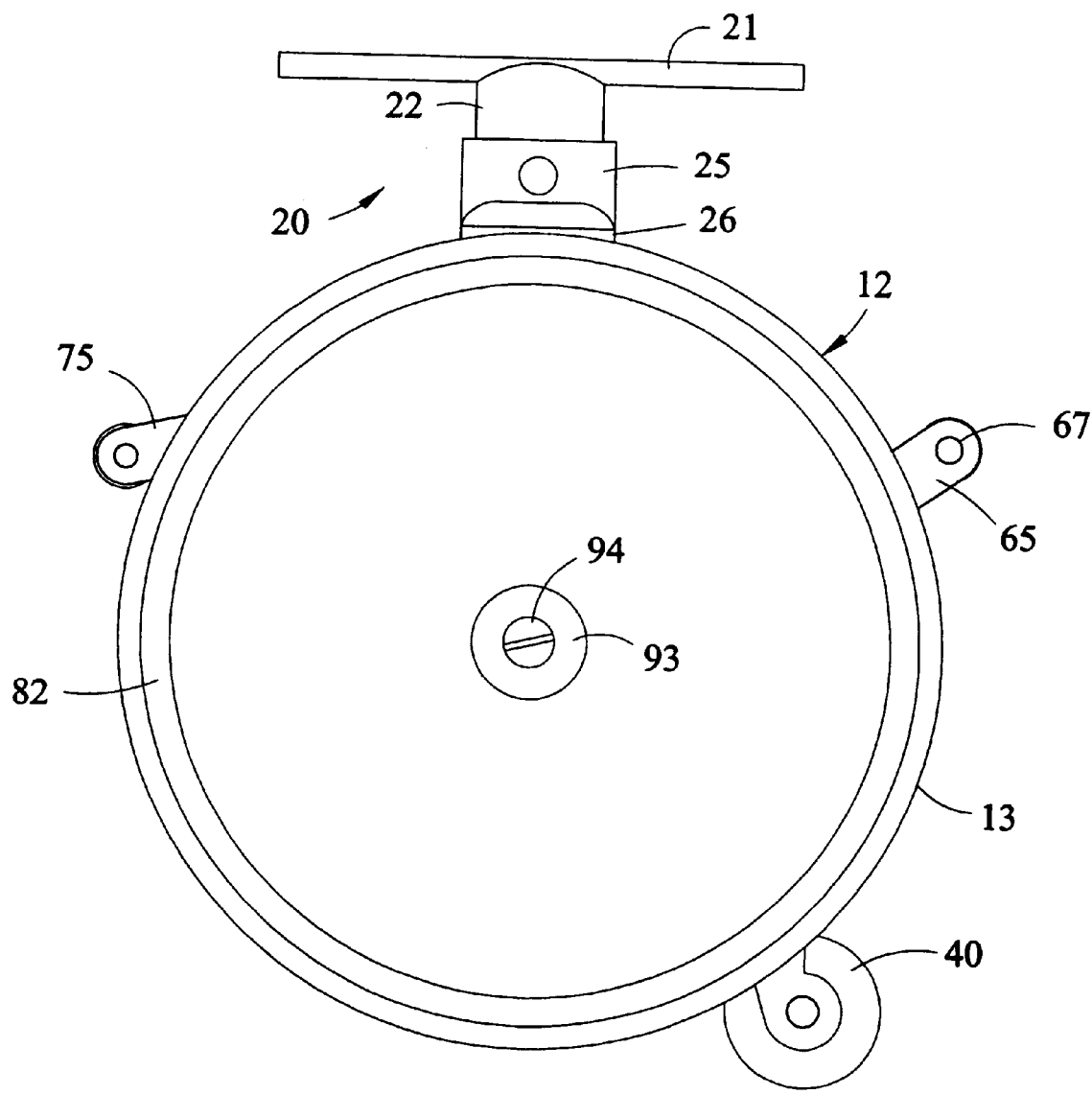
FIG. 4 is an elevation view of the outside of the spooling side of the reel shown in FIG. 1.

In FIGS. 1 and 2, footing 21 is shown in solid outline at an angle of rotation where axis A of spool 82 extends substantially at right angles to axis $A_f$ of the footing and in broken outline where axis $A_s$ of spool 82 extends substantially parallel to axis $A_f$ of the footing. Of course, it will be understood that axis $A_f$ will always parallel the longitudinal axis of the fishing rod when the reel is secured to the rod. As well, it will be readily appreciated by fishing enthusiasts that the solid outline position of footing 21 relative to spool 82 as shown in FIGS. 1 and 2 is a desirable reeling position. Similarly, the broken outline position is a desirable casting position.

Base 20 further includes a means for releasably latching stem 22 at a desired angle of rotation in bracket 25. As best seen in FIG. 1, such latching means comprises a plunger 28 supported by a flange 32, the latter of which is attached to frame 12. Shaft 29 of plunger 28, biased by spring 33, slidingly extends inwardly through a bore in bracket 25 to a point where its distal end registers and engages with a notch 23 in stem 22. In this position, stem 22 is accordingly latched against rotational movement. However, the stem may be readily unlatched and rotated in bracket 25 by manually pulling plunger 28 outwardly against the bias of spring 33.

In general, it is considered desirable that stem 22 should be latchable at least in the reeling position. However, provided that the fitting of stem 22 within bracket 25 is sufficiently tight to provide a reasonable degree of friction against rotational movement, then it need not be latchable in the casting position. If latching in the casting position is desired, then a further notch like notch 23 in stem 22 may be added.

Within frame 12, reeling side 10 includes a main drive gear 50 (see FIG. 5) mounted at one end of a shaft 42 (see FIG. 1) that extends through wall 14 into frame 12 from reel handle or crank 40 mounted at the opposed end of the shaft. Upon rotation of crank 40, gear 50 rotates about gear axis 51 which is spaced away from and parallels spool axis $A_s$. Necessarily gear 50 will rotate at the same angular velocity as the angular velocity of crank 40.

As shown in FIG. 5, main drive gear 50 is engaged by a smaller intermediate gear 52, the latter of which is mounted for rotation at free end 56 of pivot arm 55. An opposed end 57 of the arm is secured to pivot pin 58. Pivot arm 55 is biased (clockwise in FIG. 5) about pivot axis of pin 58 by a spring 62 which acts with a clockwise force on a plate 59. Like arm 55, plate 59 is secured to pin 58, thus rotation of plate 59 about the pivot axis of pin 58 produces corresponding rotation of arm 55.

When gear 52 is in the position shown in FIG. 5, it is to be understood that it engages not only gear 50 but also spool gear 88. Such engagement is depicted diagrammatically in FIG. 8 where gear 52 has been moved downwardly clockwise in relation to pivot point 58 to a point where its gear teeth engage with the gear teeth of gears 50 and 88.

Figures 8, 9:
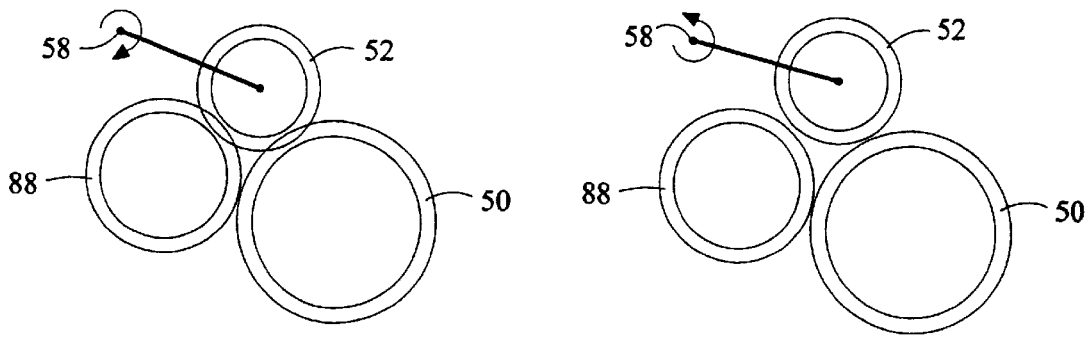
FIG. 8, appearing on the same sheet of drawings as FIG. 5, is a diagrammatic view illustrating gear positions within the reel shown in FIG. 1 when the gears are engaged.
FIG. 9, also appearing on the same sheet of drawings as FIG. 5, is a diagrammatic view illustrating gear positions within the reel shown in FIG. 1 when the gears are disengaged.

With the use of lever arm 65 which is pivotally mounted within frame 12 on pin 66, gear 52 is moveable upwardly anticlockwise from the position as shown in FIGS. 5 and 8 to a second position as depicted in FIG. 9. As can be seen in FIG. 9 the engagement between gears 50, 52 and 88 has been released.

More specifically, the underside of the inside end of lever arm 65 includes an edge surface 68 that cams upwardly against the edge of plate 59 when arm 65 is pushed downwardly on free end 67 from the position shown in FIG. 5. The camming action forces a slight anticlockwise movement of plate 59 against the bias of spring 62. Necessarily, pin 58, pivot arm 55 and gear 52 move anticlockwise by a corresponding amount. The movement is sufficient to disengage gear 52 from spool gear 88 and main drive gear 50.

Edge or camming surface 68 is configured such that when lever arm 65 is in a fully downward position then the transmitted tangential force of spring 62 on arm 65 through plate 59 is directed above the axis of pin 66. Lever arm 65 is then in a latch position, the action of spring 62 being unable to rotate lever arm 65 back to the position permitting intermediate gear 52 to engage spool gear 88. However, the latch may be readily released by pushing upwardly on end 67 of arm 65.

In operation, spool 82 is advantageously in a freewheeling mode when intermediate gear 52 is disengaged from spool gear 88 as depicted in FIG. 9. Basically, the only rotational resistance is that offered by bearings 98, 99. Conversely, when intermediate gear 52 is engaged with spool gear 88 as depicted in FIG. 8, the reel operates significantly faster than a direct drive structure since the diameter of spool gear 88 is significantly less than the diameter of main drive gear 50. Since the gears are all coplanar, the main body or frame 12 which carries the gears and related parts for controlling their engagement can be made thin and compact.

Although not essential, some fishermen prefer a reel that includes a drag or "clicker" mechanism for imposing a drag on the rotation of a reel spool. As best seen in FIG. 5, such a mechanism can be readily fitted within frame 12. The mechanism includes a detent 70 mounted to a pivot arm 71 and a spring 72 for biasing arm 71 to a drag position where the detent drags or clicks against the gear teeth of spool gear 88 (not shown in FIG. 5). Further, the mechanism includes a lever arm 75 that cams against lever arm 71, and which may be used to pivot and hold arm 71 against the bias of spring 72 to a non-drag position where detent 70 is spaced away from the teeth of gear 88. The operation of the drag mechanism is quite conventional and will not be described here in any further detail except to note that the freewheeling capability of the spool is lost whenever detent 70 enrgages or drags against the teeth of gear 88.

Various modifications and changes to the embodiment that has been described can be made without departing from the scope of the present invention, and will undoubtedly occur to those skilled in the art. For example, gears 50, 52 and 88 may have relative sizes differing from that indicated in the drawings. Likewise, differing arrangements may be readily devised for supporting intermediate gear 52 and moving it into and out of engagement with spool gear 88. Thus, the invention is not to be construed as limited to the particular embodiment that has been described and should be understood as encompassing all those embodiments that are within the spirit and scope of the claims that follow.

I claim:

1. A fishing reel, comprising:
   (a) a frame;
   (b) a base connected to said frame for securing said frame to a fishing rod, said base comprising;
      (i) a looting fittable to said rod,
      (ii) a stem fixedly connected at one end to said footing and rotatably supported at an opposed end by a bracket connected to said frame, said stem being rotatable in said bracket between a first angle of rotation where said spool axis extends substantially at right angles to a longitudinal axis of said rod and a second angle of rotation where said spool axis extends substantially parallel to said axis of said rod;
   (c) a fishing line spool rotationally mounted to said frame for rotation relative to said frame about a spool axis;
   (d) a main drive gear mounted to said frame for rotation about a drive gear axis spaced away from and extending parallel to said spool axis;
   (e) a crank for rotating said drive gear about said drive gear axis; and,
   (f) a transmission for releasably engaging said drive gear with said spool for rotating said spool about said spool axis in response to rotation of said drive gear about said drive axis, said transmission including:
      (i) a spool gear fixedly mounted to said spool, said spool gear having a spool gear axis axially aligned with said spool axis; and,
      (ii) an intermediate gear moveable between a first position engaging said drive gear in gear transmission engagement with said spool gear and a second position where said engagement is released.

2. A fishing reel as defined in claim 1, further including drag means releasably engageable with said spool gear for imposing a drag upon rotation of said spool.

3. A fishing reel as defined in claim 1, further including means for releasably latching said stem at a desired angle of rotation in said bracket.

4. A fishing reel, comprising:
   (a) a frame;
   (b) a base connected to said frame for securing said frame to a fishing rod, said base comprising:
      (i) a footing fittable to said rod;
      (ii) a stem fixedly connected at one end to said footing and rotatably supported at an opposed end by a bracket connected to said frame, said stem being rotatable in said bracket between a first angle of rotation where said spool axis extends substantially at right angles to a longitudinal axis of said rod and a second angle of rotation where said spool axis extends substantially parallel to said axis of said rod;
   (c) a fishing line spool rotationally mounted to said frame for rotation relative to said frame about a spool axis;
   (d) a main drive gear mounted to said frame for rotation about a drive gear axis spaced away from and extending parallel to said spool axis;
   (e) a crank for rotating said drive gear about said drive gear axis; and;
   (f) a transmission for releasably engaging said drive gear with said spool for rotating said spool about said spool axis in response to rotation of said drive gear about said drive axis, said transmission including:
      (i) a spool gear fixedly mounted to said spool, said spool gear having a spool gear axis axially aligned with said spool axis
      (ii) an intermediate gear mounted to a free end of a pivot arm carried within said frame, an opposed end of said pivot arm being pivotally mounted to said frame;
      (iii) a spring for biasing said pivot arm to a first position where said intermediate gear is held in gear transmission engagement with said drive gear and said spool gear; and,
      (iv) means for pivoting and holding said pivot arm against said bias to a second position where said engagement is released.

5. A fishing reel as defined in claim 4, wherein said means for pivoting and holding said pivot arm comprises a lever arm pivotally mounted within said frame, said lever arm extending from an inside end leverable against said pivot arm to a free end outside said frame, said lever arm being moveable between a release position permitting said spring to bias said pivot arm to said first pivot arm position and a latch position holding said pivot arm in said second pivot arm position against the bias of said spring.

6. A fishing reel as defined in claim 4, further including drag means releasably engageable with said spool gear for imposing a drag on rotation of said spool.

7. A fishing reel as defined in claim 6, wherein said drag means comprises:
   (a) a detent mounted to a second pivot arm within said frame; and,
   (b) a second spring for biasing said second pivot arm to a drag position where said detent drags against gear teeth of said spool gear upon rotation of said spool; and,
   (c) means for pivoting and holding said second pivot arm against said second spring bias to a non-drag position where said detent is spaced away from said teeth.

8. A fishing reel, comprising:
   (a) a frame comprising an outer cylindrical wall open at one end and closed at an opposed end by a disc shaped outer side wall;
   (b) a base connected to said frame for securing said frame to a fishing rod;
   (c) a fishing line spool rotationally mounted to said frame for rotation relative to said frame about a spool axis, said spool closing said open end of said cylindrical wall when so mounted;
   (d) a main drive gear rotationally mounted to said side wall within said cylindrical wall for rotation about a drive gear axis spaced away from and extending parallel to said spool axis;
   (e) a crank for rotating said drive gear about said drive gear axis; and,
   (f) a transmission for releasably engaging said drive gear with said spool for rotating said spool about said spool axis in response to rotation of said drive gear about said drive axis, said transmission including:
      (i) a spool gear fixedly mounted to said spool, said spool gear having a spool gear axis axially aligned with said spool axis; and, (ii) an intermediate gear rotationally mounted within said cylindrical wall and moveable between a first position engaging said drive gear in gear transmission engagement with said spool gear and a second position where said engagement is released.

9. A fishing reel as defined in claim 8, further including drag means releasably engageable with said spool gear for imposing a drag upon rotation of said spool.

10. A fishing reel as defined in claim 8, wherein said base comprises:
   (a) a footing fittable to said rod;
   (b) a stem fixedly connected at one end to said footing and rotatably supported at an opposed end by a bracket connected to said frame, said stem being rotatable in said bracket between a first angle of rotation where said spool axis extends substantially at right angles to a longitudinal axis of said rod and a second angle of rotation where said spool axis extends substantially parallel to said axis of said rod.

11. A fishing reel as defined in claim 10, further including means for releasably latching said stem at a desired angle of rotation in said bracket.

12. A fishing reel, comprising:
   (a) a frame comprising an outer cylindrical wall open at one end and closed at an opposed end by a disc shaped outer side wall;
   (b) a base connected to said frame for securing said frame to a fishing rod;
   (c) a fishing line spool rotationally mounted to said frame for rotation relative to said frame about a spool axis, said spool closing said open end of said cylindrical wall when so mounted;
   (d) a main drive gear rotationally mounted to said side wall within said cylindrical wall for rotation about a drive gear axis spaced away from and extending parallel to said spool axis;
   (e) a crank for rotating said drive gear about said drive gear axis; and,
   (e) a transmission for releasably engaging said drive gear with said spool for rotating said spool about said spool axis in response to rotation of said drive gear about said drive axis, said transmission including:
      (i) a spool gear fixedly mounted to said spool, said spool gear having a spool gear axis axially aligned with said spool axis;
      (ii) an intermediate gear rotationally mounted within said cylindrical wall to a free end of a pivot arm, an opposed end of said pivot arm being pivotally mounted to said side wall within said cylindrical wall;
      (iii) a spring for biasing said pivot arm to a first position where said intermediate gear is held in gear transmission engagement with said drive gear and said spool gear; and,
      (iv) means for pivoting and holding said pivot arm against said bias to a second position where said engagement is released.

13. A fishing reel as defined in claim 12, wherein said means for pivoting and holding said pivot arm comprises a lever arm pivotally mounted to said outer side wall, said lever arm extending from an inside end leverable against said pivot arm to a free end outside said frame, said lever arm being moveable between a release position permitting said spring to bias said pivot arm to said first pivot arm position and a latch position holding said pivot arm in said second pivot arm position against the bias of said spring.

14. A fishing reel as defined in claim 12, further including drag means releasably engageable with said spool gear for imposing a drag on rotation of said spool.

15. A fishing reel as defined in claim 14, wherein said drag means comprises:
   (a) a detent mounted to a second pivot arm within said frame; and,
   (b) a second spring for biasing said second pivot arm to a drag position where said detent drags against gear teeth of said spool gear upon rotation of said spool; and,
   (c) means for pivoting and holding said second pivot arm against said second spring bias to a non-drag position where said detent is spaced away from said teeth.

* * * * *